(12) United States Patent
Levi

(10) Patent No.: US 9,481,314 B2
(45) Date of Patent: Nov. 1, 2016

(54) VEHICLE ROOF RACK WITH COLLAPSIBLE HANDRAIL ASSEMBLY

(71) Applicant: Avraham Y. Levi, Eagan, MN (US)

(72) Inventor: Avraham Y. Levi, Eagan, MN (US)

(73) Assignee: ROM ACQUISITION CORPORATION, Belton, MO (US)

( * ) Notice: Subject to any disclaimer, the term of this patent is extended or adjusted under 35 U.S.C. 154(b) by 34 days.

(21) Appl. No.: 14/429,282

(22) PCT Filed: Sep. 10, 2013

(86) PCT No.: PCT/US2013/058887
§ 371 (c)(1),
(2) Date: Mar. 18, 2015

(87) PCT Pub. No.: WO2014/046904
PCT Pub. Date: Mar. 27, 2014

(65) Prior Publication Data
US 2015/0246643 A1    Sep. 3, 2015

Related U.S. Application Data

(60) Provisional application No. 61/702,627, filed on Sep. 18, 2012.

(51) Int. Cl.
*B60R 9/058* (2006.01)
*B60R 9/045* (2006.01)
*B60R 3/00* (2006.01)

(52) U.S. Cl.
CPC ............ *B60R 9/058* (2013.01); *B60R 3/005* (2013.01); *B60R 9/045* (2013.01)

(58) Field of Classification Search
CPC ....... B60R 9/058; B60R 3/005; B60R 9/045; B60R 9/0423
See application file for complete search history.

(56) References Cited

U.S. PATENT DOCUMENTS

| | | | | |
|---|---|---|---|---|
| 966,740 | A * | 8/1910 | Bond | B65D 9/04 147/1 |
| 1,506,422 | A * | 8/1924 | Gibbons | B60R 9/02 224/42.34 |
| 1,835,480 | A * | 12/1931 | Fendorf | B60R 9/045 224/314 |
| 2,663,472 | A * | 12/1953 | Belgau | B60R 9/058 224/320 |
| 4,371,056 | A * | 2/1983 | Anglade | E06C 5/02 182/106 |
| 4,759,437 | A * | 7/1988 | Bevins | B64F 1/32 182/113 |
| 5,237,932 | A * | 8/1993 | Edwards | B61D 19/023 104/124 |
| 5,544,671 | A | 8/1996 | Phillips | |
| 6,045,157 | A * | 4/2000 | Poulin | B60R 3/005 182/113 |
| 7,753,615 | B1* | 7/2010 | Sprague | B60P 3/40 224/405 |

(Continued)

FOREIGN PATENT DOCUMENTS

WO    WO 2009126286 A1 * 10/2009    ............. B60R 9/058

*Primary Examiner* — Alvin Chin-Shue
(74) *Attorney, Agent, or Firm* — Nikolai & Mersereau, P.A.; Thomas J. Nikolai

(57) ABSTRACT

A safety railing for attachment to a vehicle roof mounted rack to reduce the likelihood of fall injuries to workers who have mounted to roof of the vehicle has a pair of side railings joined by a front railing and supported by balusters that pivotally attach to the roof rack. A crank operated mechanism is provided for shifting the balusters between an erect, vertical orientation and a collapsed orientation where the safety railing lies flat against the roof rack.

6 Claims, 5 Drawing Sheets

(56) References Cited

U.S. PATENT DOCUMENTS

| | | | |
|---|---|---|---|
| 8,632,099 B2* | 1/2014 | Conny | B60R 3/005 182/113 |
| 9,126,536 B2* | 9/2015 | Meacham | B60R 3/005 |
| 2002/0125736 A1 | 9/2002 | Messano | |
| 2003/0020253 A1* | 1/2003 | Bosman | B60R 3/005 280/164.1 |
| 2008/0149675 A1 | 6/2008 | Moreau et al. | |
| 2008/0308138 A1 | 12/2008 | Brochier et al. | |
| 2011/0109120 A1 | 5/2011 | Bonerb | |

\* cited by examiner

VEHICLE ROOF RACK WITH COLLAPSIBLE HANDRAIL ASSEMBLY

CROSS REFERENCE TO RELATED APPLICATION

This application is a 371 of International application no. PCT/US2013/058887, filed Sep. 10, 2013, which claims priority to U.S. provisional application, Ser. No. 61/702,627, filed Sep. 18, 2012, the contents of which are hereby incorporated by reference.

BACKGROUND OF THE INVENTION

I. Field of the Invention

This invention relates generally to safety equipment, and more particularly to a vehicle roof rack having a guardrail structure for use on cargo vans to preclude fall accidents to workers who may have occasion to stand on the vehicle's roof.

II. Discussion of the Prior Art

There are occupations that require workers to climb onto and stand on the roof of a motor vehicle, such as cargo vans and the like. For example, video news photographers frequently mount the roof of their vehicle to obtain recordings in a crowd scene. Likewise, electricians are frequently called upon to install wiring and lighting or other fixtures at elevated locations where ladder access is inconvenient. Working from a vehicle rooftop location is not without risk, however. Should a person stumble and fall, serious injury can result.

It is known in the art to provide railings on a vehicle's roof to inhibit falling. The Satchwell III Pat. No. 5,249,436 shows one such arrangement where a collapsible railing structure is bolted or otherwise affixed directly to the vehicle's roof, thus causing permanent damage to the vehicle at numerous points along either side of the vehicle's roof where railing balusters have been located. The Ciarfello Pat. No. 7,841,644 also discloses a vehicle with a roof mounted deck having a railing but the disclosed approach requires major alteration to the vehicle.

A need exists for a handrail system that is attachable to a vehicle without causing damage to the vehicle. The present invention fulfills this need.

SUMMARY OF THE INVENTION

The present invention comprises a vehicle roof rack that can be securely clamped to the roof of a cargo van without any damage or alteration to the vehicle itself and which incorporates a collapsible handrail structure that can be readily raised and lowered by manual rotation of a crank arm. The roof rack preferably comprises the one described in Published PCT Application WO/2009/126286 A1, the contents of which are hereby incorporated by reference as if fully set forth herein. The roof rack portion of the invention itself is an extremely strong, yet lightweight and easy to assemble on the roof of motor vehicles without any damage to the vehicle. It is fabricated for the most part using extruded aluminum tubing to create side members and crossbars for joining the side members to one another across the width dimension of the vehicle roof Each side member comprises a pair of elongated rails that are clamped together by a series of clamps that cooperate with attachment spines integrally formed with the rails. Attachment flanges forming a part of the extrusion on one rail on each side member facilitates attachment of the crossbar members thereto. The roof rack structure is adapted to be clamped to the vehicle's rain gutter using specially designed clamps that will not mar or distort the rain gutter at points of attachment.

The handrail structure of the present invention is adapted to attach to crossbars of the ladder rack and comprises a pair of tubular side handrails, each longitudinally extending and pivotally hinged to upper ends of a pair of balusters that also have their lower ends pivotally hinged to separate ones of the crossbars. A front tubular handrail extends between the front ends of the pair of side rails. When not in use, the handrail assembly collapses down to lie flat on the ladder rack. To elevate the handrail assembly to its upright disposition, there is provided a transversely extending rod that is coupled by bearing brackets to a separate crossbar and the rod is adapted to be rotated by a crank arm affixed to one end thereof. Extending between the rotatable rod and a pair of balusters are first and second slide arms whose upper ends include a follower that is designed to slide in a groove in the cooperating balusters. As the crank arm is turned to rotate the rod, the slide arms rotate with that rod and urge the cooperating balusters to their vertical orientation. To again lower the handrail assembly to its collapsed disposition, the crank arm is rotated in the opposite direction, thereby causing the balusters to rotate downwards.

DESCRIPTION OF THE DRAWINGS

The foregoing features, objects and advantages of the invention will become apparent to those skilled in the art from the following detailed description of a preferred embodiment, especially when considered in conjunction with the accompanying drawings in which like numerals in the several views referred to corresponding parts.

DESCRIPTION OF THE PREFERRED EMBODIMENT

Figure 1:
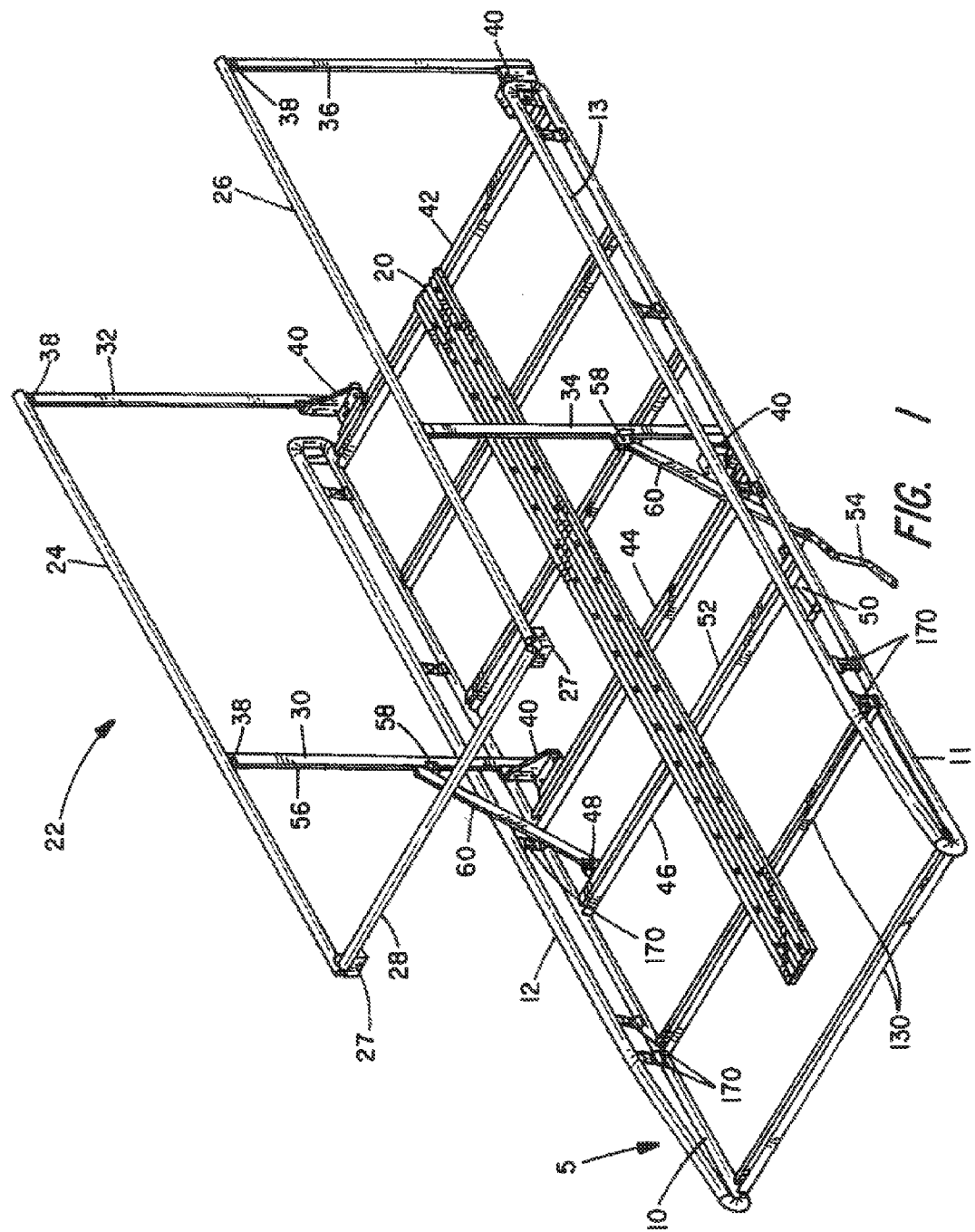
FIG. 1 is a perspective rear view showing the ladder rack and associated handrail assembly in its fully elevated condition.

This description of the preferred embodiments is intended to be read in connection with the accompanying drawings, which are to be considered part of the entire written description of this invention. In the description, relative terms such as "lower", "upper", "horizontal", "vertical", "above", "below", "up", "down", "top" and "bottom" as well as derivatives thereof (e.g., "horizontally", "downwardly", "upwardly", etc.) should be construed to refer to the orientation as then described or as shown in the drawings under discussion. These relative terms are for convenience of description and do not require that the apparatus be constructed or operated in a particular orientation. Terms such as "connected", "connecting", "attached", "attaching", "join" and "joining" are used interchangeably and refer to one structure or surface being secured to another structure or surface or integrally fabricated in one piece, unless expressively described otherwise.

In FIG. 1, the roof rack is indicated generally by numeral 5 and has a right primary 10 and a left primary 11 side rail a right 12 and left 13 secondary side rail coupled to one another by a plurality of side rail spacing clamps 170 that connect the right primary side rail 10 to the right secondary side rail 12 and connect the left primary side rail 11 to the left secondary side rail 13. A plurality of cross bar members 130 are seen connecting the right primary side rail 10 to the left primary side rail 11 all as described in the afore-referenced Published PCT Application WO/2009/127286A1. Extending along the length dimension of the roof rack 5 and resting upon the cross bar members 130 is a walkway 20.

The collapsible handrail assembly is indicated generally by numeral 22 and comprises right and left tubular side rails 24 and 26 and a front cross rail 28 that is affixed to the front end portions of the side rails 24 and 26 using suitable L-brackets 27. The right most hand rail 24 has associated with it a pair of balusters 30 and 32. Similarly, the left side handrail 26 has associated with it balusters 34 and 36. More particularly, the upper ends of the balusters 30, 32, 34 and 36 have a hinge connection between them and their associated tubular side rails as at 38.

Figure 1A:
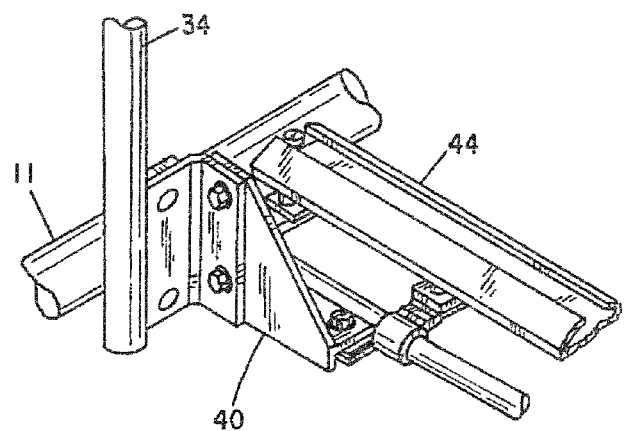
FIG. 1A is a detail view of the hinge connecting to the balusters to a roof rack cross bar.
Figure 1B:
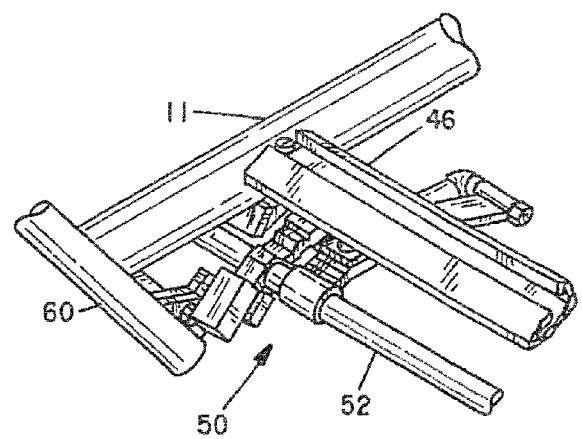
FIG. 1B is a detail view of journal coupling to the actuator rod to a roof rack cross bar.

The lower ends of the balusters 30, 32, 34 and 36 are coupled by hinge brackets 40 to a rear cross bar 42 and to an intermediate cross bar 44. See the detail view of FIG. 1A. An adjacent intermediate cross bar 46 has clamped to it bearing brackets, as at 48 and 50. The bearing brackets 48 and 50 journal a transversely extending actuator rod 52 therein. See the detail of FIG. 1B. Affixed to one end of the rod 52 is a crank arm 54 which is used to rotate the rod 52 within its bearing brackets 48 and 50.

Figure 1C:
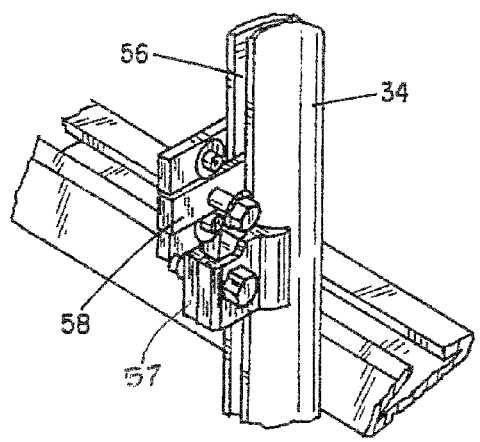
FIG. 1C is a detail view of the follower coupling the pivot arm to a longitudinal groove in the frontmost balusters.

As best seen in the detail view of FIG. 1C, each of the balusters 30 and 34 has a longitudinal bead 56 formed in a front edge thereof and fitted onto the bead 56 is a slidable follower 57 having a slidable latch 58. The follower is affixed to an end of a pivot arm 60. The slidable latch 58 can be made to slide in and out from a notch (not shown) formed in the bead 56 of the balusters 30 and 34. The lower ends of the pivot arms 60 are coupled to the rotatable actuator rod 52.

Figure 2:
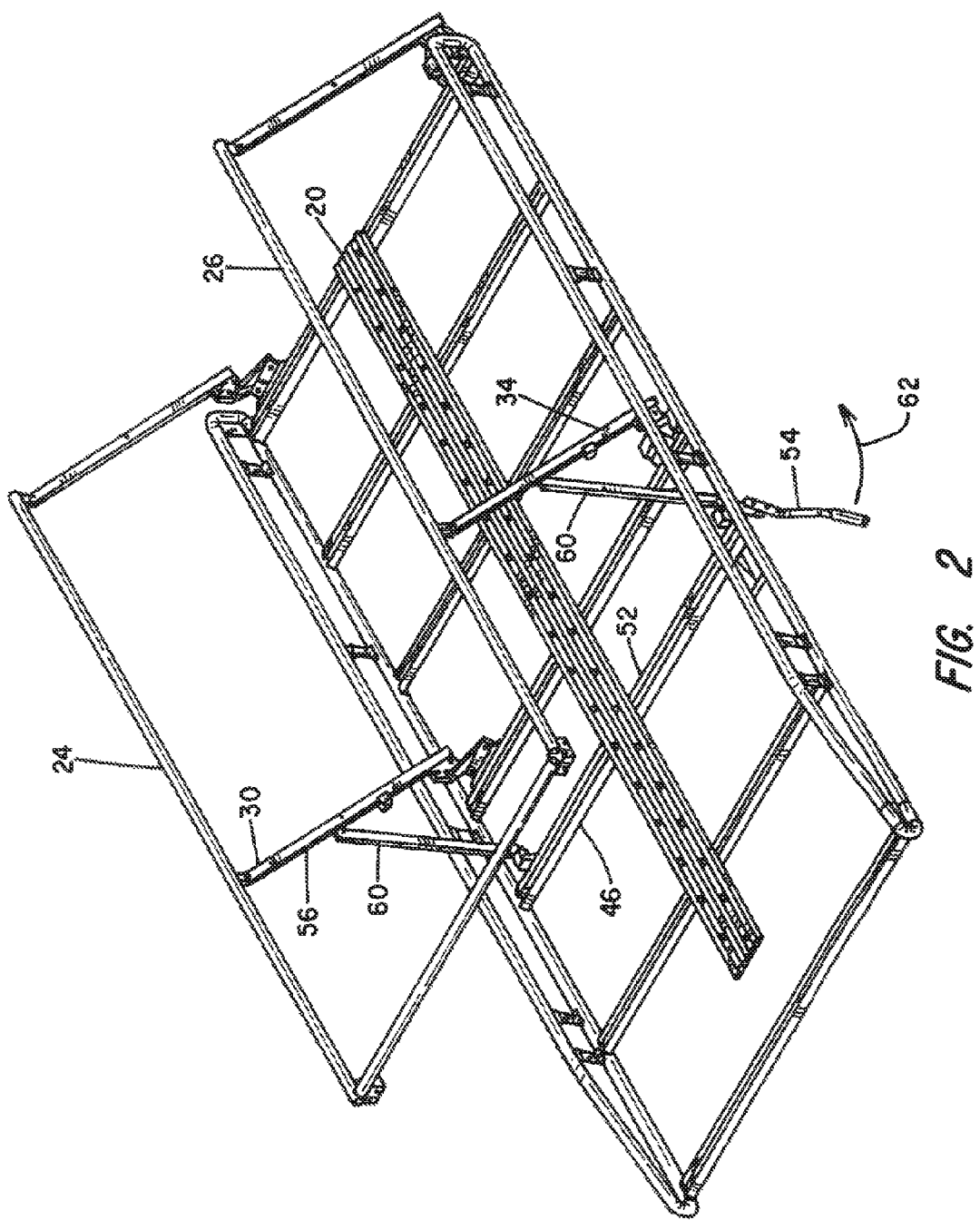
FIG. 2 is a perspective view showing the orientation of the various components as the handrail assembly is being lowered.
Figure 3:
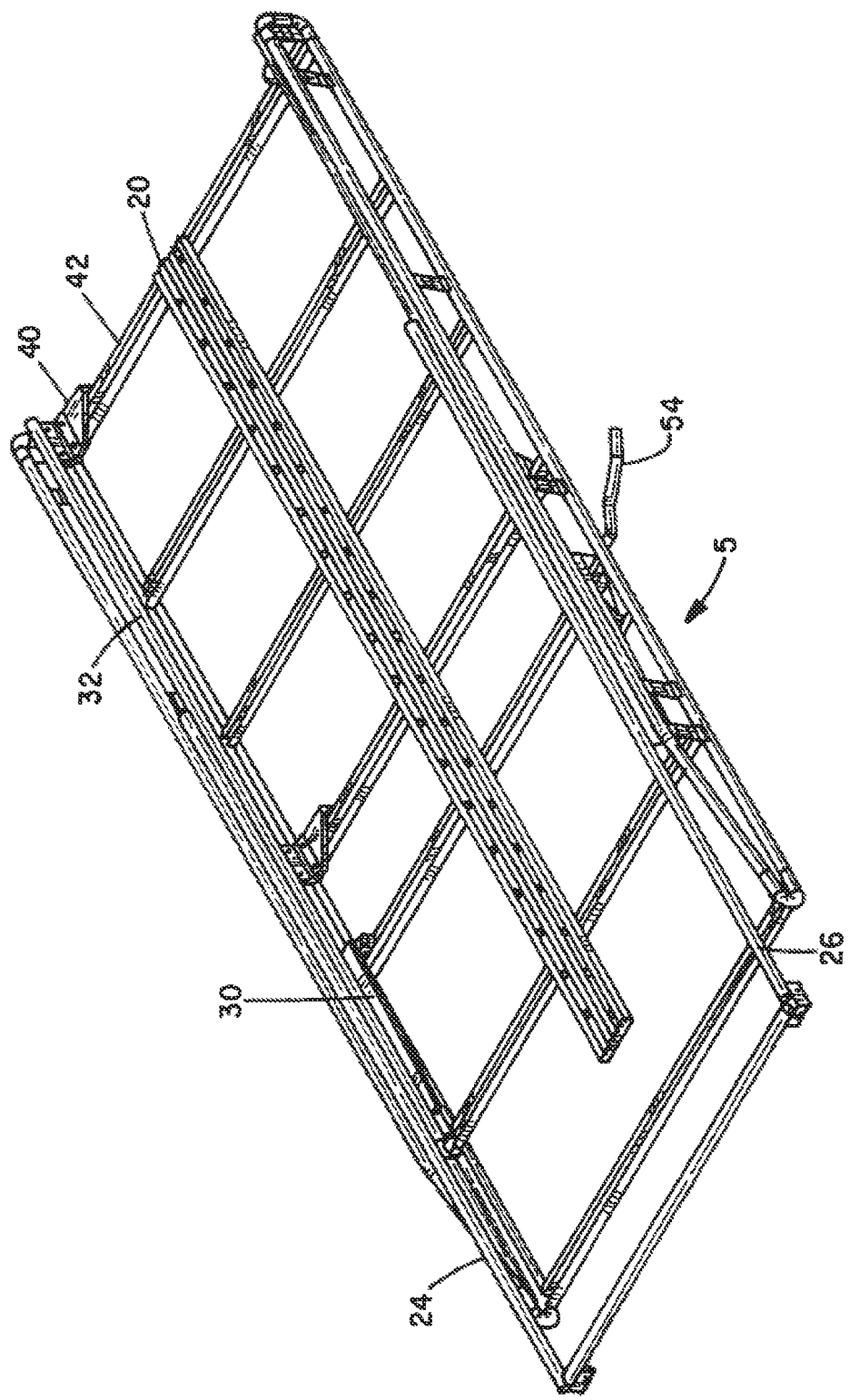
FIG. 3 is a perspective view showing the ladder rack with the handrail assembly fully collapsed onto the roof rack.

As can be seen in FIGS. 1C and 2, as the crank arm 54 is moved in the direction of the arrow 62, latches 58 in the followers 57 are pulled out a notch in the balusters 30 and 34 and allow the followers 57 to slide along the bead 56 in the balusters 30 and 34 and when the pivot arms 60 rotate with the rod 52, applying a pulling force on the balusters 30 and 34 as followers 57 on the upper ends of the pivot arms 60 ride upward in their associated grooves 56 of the balusters 30 and 34. This causes the handrails 24 and 26 to descend. Referring to FIG. 3, the handrails 24 and 26 are shown as completely lowered and are resting, along with the associated balusters 30, 32, 34 and 36 on the ladder rack structure 5. It is in this position when the vehicle is being driven to and from a job site. In the elevated position, the latches 58 in the slidable followers 57 slide into the notch (not shown) in the bead along balusters 30 and 34 and lock the handrail in its elevated position so as not to fold or collapse when force is applied to the handrail tubes 24 and 26.

Figure 4:
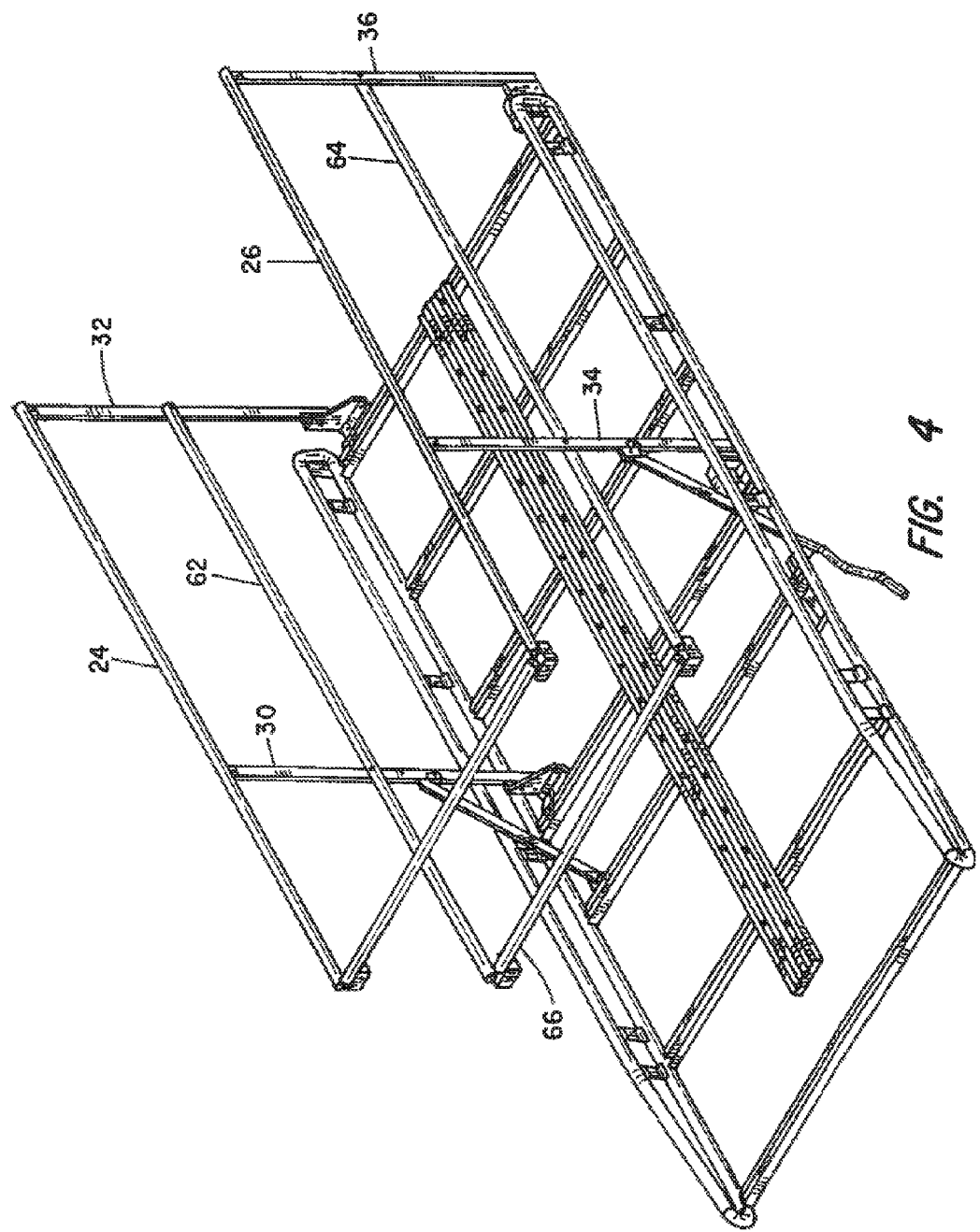
FIG. 4 is an alternative embodiment of the collapsible handrail assembly of the present invention.

In an alternative embodiment shown in FIG. 4, an additional pair of side rails 62, 64 joined by a front cross rail 66 may be pivotally jointed to the balusters 30, 32, 34 and 36 midway between the upper side rails 24 and 26 and the lower ends of the balusters to provide additional rigidity to the assembly and to afford more of a barrier to persons working atop the vehicle.

Thus, the present invention is well adapted to carry out the objects and attain the ends and advantages mentioned above as well as those inherent therein. While a preferred embodiment of the invention has been described for the purpose of this disclosure, numerous changes in the construction and arrangement of parts may be made by those skilled in the art, which changes are encompassed within the spirit of this invention as defined by the appended claims.

The invention claimed is:

1. A roof rack for a motor vehicle comprising:
   (a) left and right longitudinal side rail assemblies held in parallel, spaced-apart relation by a plurality of transversely extending parallel crossbars that clamp at opposed ends to the left and right side rail assemblies and where selected ones of the plurality of crossbars are adapted to be affixed onto a roof of a motor vehicle;
   (b) first and second longitudinal hand rails coupled to one another by a front rail;
   (c) at least two pairs of balusters, a first pair being pivotally hinged at one end to first and second ones of the plurality of crossbars and pivotally attached at their opposite ends to the first hand rail, a second of the pair of balusters pivotally hinged at one end to said first and second ones of the plurality of crossbars and pivotally attached at their opposite end to the second hand rail; and
   (d) a mechanism operatively coupled to a third one of the plurality of crossbars and to one of the first pair of balusters and to one of the second pair of balusters for simultaneously rotating said one of the first and second pairs of balusters between a generally horizontal orientation and a generally vertical orientation; said mechanism including:
      (i) a transversely extending rod coupled to and journaled for rotation adjacent the third one of the plurality of crossbars;
      (ii) a pair of pivot arms operatively coupled to the transversely extending rod and to said one of the first and second pairs of balusters; and
      (iii) a crank handle affixed to the rod for rotating the rod.

2. The roof rack of claim 1 wherein the one of the first and second pairs of balusters each include a longitudinal bead and the pair of pivot arms each having a slidable follower at an end thereof cooperating with the bead in the baluster with which it is operatively coupled as the crank handle is turned.

3. The roof rack of claim 1 and further including a longitudinally extending planar walkway member affixed to the plurality of crossbars generally midway between opposed ends of the crossbars.

4. The roof rack of claim 1 wherein the transversely extending rod is coupled to the third one of the crossbars by clamp members rigidly affixed to the third one of the crossbars, the clamp members including tubular portions by which the longitudinally extending rod is rotationally supported.

5. The roof rack as in claim 1 wherein the first pair and second pair of balusters are rigidly affixed by a bracket to a transversely extending hinge pin that is rotatable in journal brackets affixed to selected ones of the plurality of crossbars.

6. The roof rack as in claim 2 and further including a slidable latch on the slidable follower for releasably locking the balusters in the generally vertical orientation.

* * * * *